US010644902B1

(12) United States Patent
Sodhi et al.

(10) Patent No.: US 10,644,902 B1
(45) Date of Patent: May 5, 2020

(54) METHOD, SYSTEM, AND APPARATUS FOR CLASSIFYING UPLINK AND DOWNLINK TRAFFIC IN NETWORKS

(71) Applicant: Juniper Networks, Inc., Sunnyvale, CA (US)

(72) Inventors: Sandesh Kumar Sodhi, Sunnyvale, CA (US); Ashish Gupta, Sunnyvale, CA (US); Kaliraj Vairavakkalai, Fremont, CA (US)

(73) Assignee: Juniper Networks, Inc, Sunnyvale, CA (US)

( * ) Notice: Subject to any disclaimer, the term of this patent is extended or adjusted under 35 U.S.C. 154(b) by 129 days.

(21) Appl. No.: 15/053,203

(22) Filed: Feb. 25, 2016

(51) Int. Cl.
| H04L 12/46 | (2006.01) |
| H04L 29/12 | (2006.01) |
| H04L 12/723 | (2013.01) |
| H04W 72/12 | (2009.01) |
| H04L 12/24 | (2006.01) |

(52) U.S. Cl.
CPC ......... *H04L 12/4675* (2013.01); *H04L 41/12* (2013.01); *H04L 45/50* (2013.01); *H04L 61/2007* (2013.01); *H04W 72/1284* (2013.01); *H04W 72/1289* (2013.01)

(58) Field of Classification Search
None
See application file for complete search history.

(56) References Cited

U.S. PATENT DOCUMENTS

| 7,773,542 B2 * | 8/2010 | Lu | H04W 40/246 370/254 |
| 2003/0195005 A1 * | 10/2003 | Ebata | H04W 40/06 455/445 |
| 2008/0056130 A1 * | 3/2008 | Desai | H04L 12/2801 370/231 |

(Continued)

FOREIGN PATENT DOCUMENTS

| CN | 102724117 A * | 10/2012 | ............. H04L 45/36 |
| WO | WO 2011160367 A1 * | 12/2011 | ....... H04L 29/12367 |

OTHER PUBLICATIONS

Subnetwork, https://en.wikipedia.org/wiki/Subnetwork, as accessed Jan. 14, 2016, Wikipedia, (Sep. 25, 2004).

(Continued)

*Primary Examiner* — Robert M Morlan
*Assistant Examiner* — Rodrick Mak
(74) *Attorney, Agent, or Firm* — FisherBroyles, LLP

(57) ABSTRACT

The disclosed computer-implemented method for classifying uplink and downlink traffic in networks may include (1) maintaining a routing table that includes a plurality of routes that define paths to a plurality of network destinations in connection with a network, (2) receiving a packet to be routed toward a network destination based at least in part on a route that defines a path to the network destination in connection with the MPLS network, (3) identifying, within the routing table, the route that defines the path to the network destination, (4) determining, based at least in part on the route identified within the routing table, whether the (Continued)

packet represents uplink or downlink traffic, and then (5) classifying the packet as uplink or downlink traffic based at least in part on the determination. Various other methods, systems, and apparatuses are also disclosed.

18 Claims, 6 Drawing Sheets

(56) References Cited

U.S. PATENT DOCUMENTS

| | | | | |
|---|---|---|---|---|
| 2009/0316657 A1* | 12/2009 | Singh | ............... | H04W 68/00 370/331 |
| 2010/0157888 A1* | 6/2010 | Aggarwal | ........... | H04L 12/1868 370/328 |
| 2010/0329252 A1* | 12/2010 | Mulamalla | ............. | H04L 12/18 370/390 |
| 2011/0096695 A1* | 4/2011 | Natarajan | ............... | H04L 45/04 370/254 |
| 2013/0258963 A1* | 10/2013 | Mihaly | ............... | H04L 12/4633 370/329 |
| 2014/0313928 A1* | 10/2014 | Fernando | ................ | H04L 45/02 370/254 |
| 2015/0156142 A1* | 6/2015 | Li | ........................... | H04L 45/68 370/389 |
| 2015/0245196 A1* | 8/2015 | Rivas Molina | ....... | H04W 8/186 370/259 |
| 2018/0027451 A1* | 1/2018 | Sun | ...................... | H04W 28/10 |

OTHER PUBLICATIONS

Routing table, https://en.wikipedia.org/wiki/Routing_table, as accessed Jan. 14, 2016, Wikipedia, ( Apr. 14, 2004).

Hop (networking), https://en.wikipedia.org/wiki/Hop_(networking), as accessed Jan. 14, 2016, Wikipedia, (Sep. 5, 2010).

Cisco Networking Academy's Introduction to Routing Dynamically, http://www.ciscopress.com/articles/article.asp?p=2180210 &seqNum=12, as accessed Jan. 14, 2016, (Mar. 24, 2014).

Configuring Dynamic Access Routes for Subscriber Management, http://www.juniper.net/documentation/en_US/junos13.3/topics/task/configuration/subscriber-management-dynamic-access-routes.html, as accessed Jan. 14, 2016, TechLibrary, Juniper Networks, Inc., (Dec. 5, 2013).

policy-statement, http://www.juniper.net/techpubs/en_US/junos14.1/topics/reference/configuration-statement/policy-statement-edit-policy-options.html, as accessed Jan. 14, 2016, TechLibrary, Juniper Networks, Inc., (On or before Feb. 28, 2015).

Actions in Routing Policy Terms, http://www.juniper.net/techpubs/en_US/junos14.1/topics/usage-guidelines/policy-configuring-actions-in-routing-policy-terms.html, as accessed Jan. 14, 2016, TechLibrary, Juniper Networks, Inc., (Sep. 20, 2014).

* cited by examiner

Routing Table 120

| Destination | Gateway | Subscriber Identifier | Traffic Direction |
|---|---|---|---|
| 10.52.50.1 | 10.52.50.0 | 9928372761 | Uplink |
| 10.52.78.2 | 10.52.51.1 | 1298380372 | Downlink |
| 10.52.52.4 | 10.52.52.3 | 2482770462 | Uplink |
| 10.52.60.4 | 10.52.60.0 | 4876093480 | Downlink |
| 10.52.60.5 | 10.52.60.0 | 1838904009 | Downlink |
| 10.52.60.6 | 10.52.60.0 | 7973478021 | Downlink |
| 10.52.62.4 | 10.52.60.0 | 4894020923 | Downlink |

FIG. 5

METHOD, SYSTEM, AND APPARATUS FOR CLASSIFYING UPLINK AND DOWNLINK TRAFFIC IN NETWORKS

BACKGROUND

Network traffic is often characterized as either uplink traffic or downlink traffic. In this context, the term "uplink traffic" typically refers to network traffic that originates from a computing device of a service provider's subscriber and traverses toward an external network (such as the Internet). In contrast, the term "downlink traffic" typically refers to network traffic that originates from an external network and traverses toward a computing device of a service provider's subscriber. For example, from the perspective of a subscriber's computing device, uplink traffic may represent uploaded data, and downlink traffic may represent downloaded data.

The direction of network traffic may be significant for various reasons. In one example, the direction of network traffic may affect certain policies. For example, a service provider may allow, facilitate, and/or transfer downlink traffic at higher speeds than uplink traffic. These different traffic speeds may vary from one subscriber to the next. Accordingly, the service provider may determine which policy to apply to a subscriber's network traffic based at least in part on the direction of the network traffic and the subscriber's identity and/or service plan.

Unfortunately, some types of traditional networks may be unable to distinguish between uplink and downlink traffic. For example, a service provider's MultiProtocol Label Switching (MPLS) network may include routers that support and/or facilitate Layer 3 Virtual Private Network (L3VPN) traffic for Virtual Routing and Forwarding (VRF) subscribers. These routers may include physical and/or logical interfaces that each handle both uplink and downlink L3VPN traffic. Since each interface handles both uplink and downlink L3VPN traffic, these routers may have no way of determining whether such traffic is uplink or downlink relative to the service provider's subscriber base.

The instant disclosure, therefore, identifies and addresses a need for additional and improved methods, systems, and apparatuses for classifying uplink and downlink traffic in networks.

SUMMARY

As will be described in greater detail below, the instant disclosure generally relates to methods, systems, and apparatuses for classifying uplink and downlink traffic in networks. In one example, a method for accomplishing such a task may include (1) maintaining a routing table that includes a plurality of routes that define paths to a plurality of network destinations in connection with a network, (2) receiving a packet to be routed toward a network destination based at least in part on a route that defines a path to the network destination in connection with the network, (3) identifying, within the routing table, the route that defines the path to the network destination, (4) determining, based at least in part on the route identified within the routing table, whether the packet represents uplink or downlink traffic, and then (5) classifying the packet as uplink or downlink traffic based at least in part on the determination.

Similarly, a system for implementing the above-described method may include (1) a maintenance module, stored in memory, that maintains a routing table that includes a plurality of routes that define paths to a plurality of network destinations in connection with a network, (2) a receiving module, stored in memory, that receives a packet to be routed toward a network destination based at least in part on a route that defines a path to the network destination in connection with the network, (3) an identification module, stored in memory, that identifies, within the routing table, the route that defines the path to the network destination, (4) a determination module, stored in memory, that determines, based at least in part on the route identified within the routing table, whether the packet represents uplink or downlink traffic, (5) a classification module, stored in memory, that classifies the packet as uplink or downlink traffic based at least in part on the determination, and (6) at least one physical processor that executes the maintenance module, the receiving module, the identification module, the determination module, and the classification module.

An apparatus for implementing the above-described method may include (1) a memory device that stores a routing table that includes a plurality of routes that define paths to a plurality of network destinations in connection with a network and (2) a processing unit communicatively coupled to the memory device, wherein the processing unit (A) receives a packet to be routed toward a network destination based at least in part on a route that defines a path to the network destination in connection with the network, (B) identifies, within the routing table, the route that defines the path to the network destination, (C) determines, based at least in part on the route identified within the routing table, whether the packet represents uplink or downlink traffic, and then (D) classifies the packet as uplink or downlink traffic based at least in part on the determination.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is an illustration of an exemplary routing table that facilitates classifying uplink and downlink traffic in networks

Figure 1:
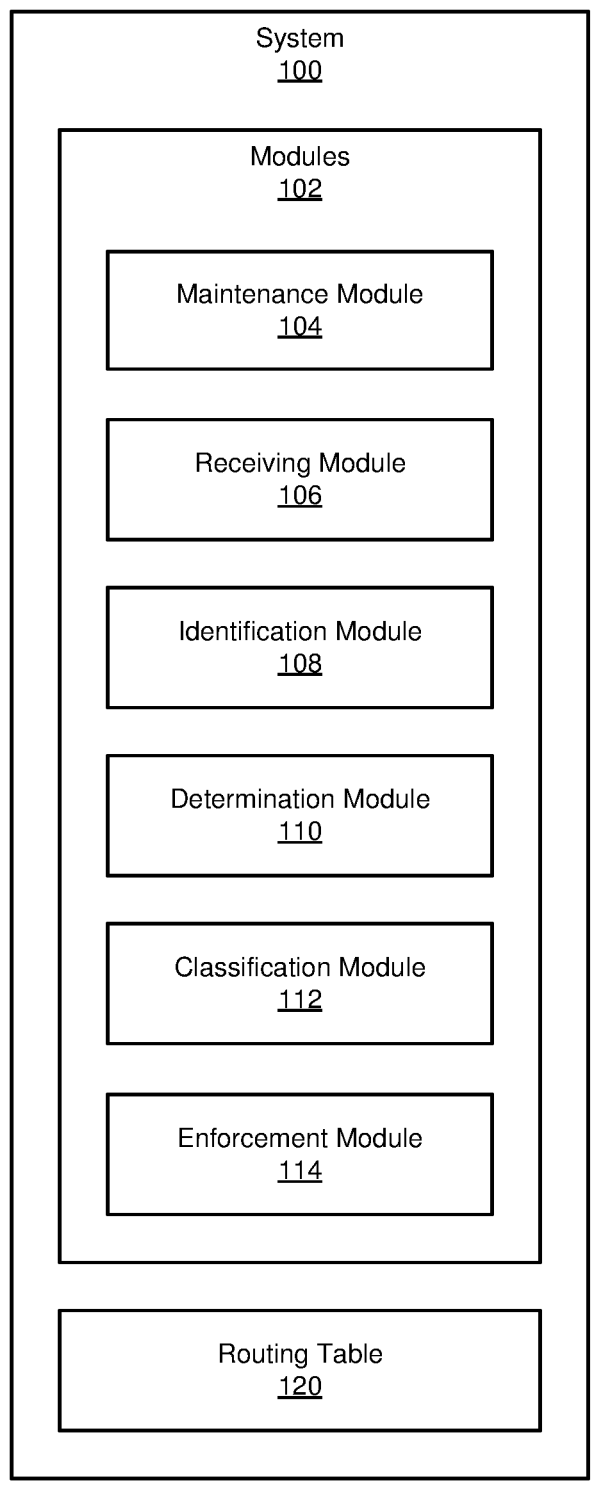
FIG. 1 is a block diagram of an exemplary system for classifying uplink and downlink traffic in networks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various methods, systems, and apparatuses for classifying uplink and downlink traffic in networks. As will be explained in greater detail below, embodiments of the instant disclosure may enable network devices to determine the direction of L3VPN traffic in MPLS networks. As a result, embodiments of the instant disclosure may enable network devices to classify such L3VPN traffic as either uplink or downlink. Accordingly, embodiments of the instant disclosure may enable network devices to apply policies to such L3VPN traffic based at least in part on the traffic's direction and the corresponding subscriber's service plan.

Figure 2:
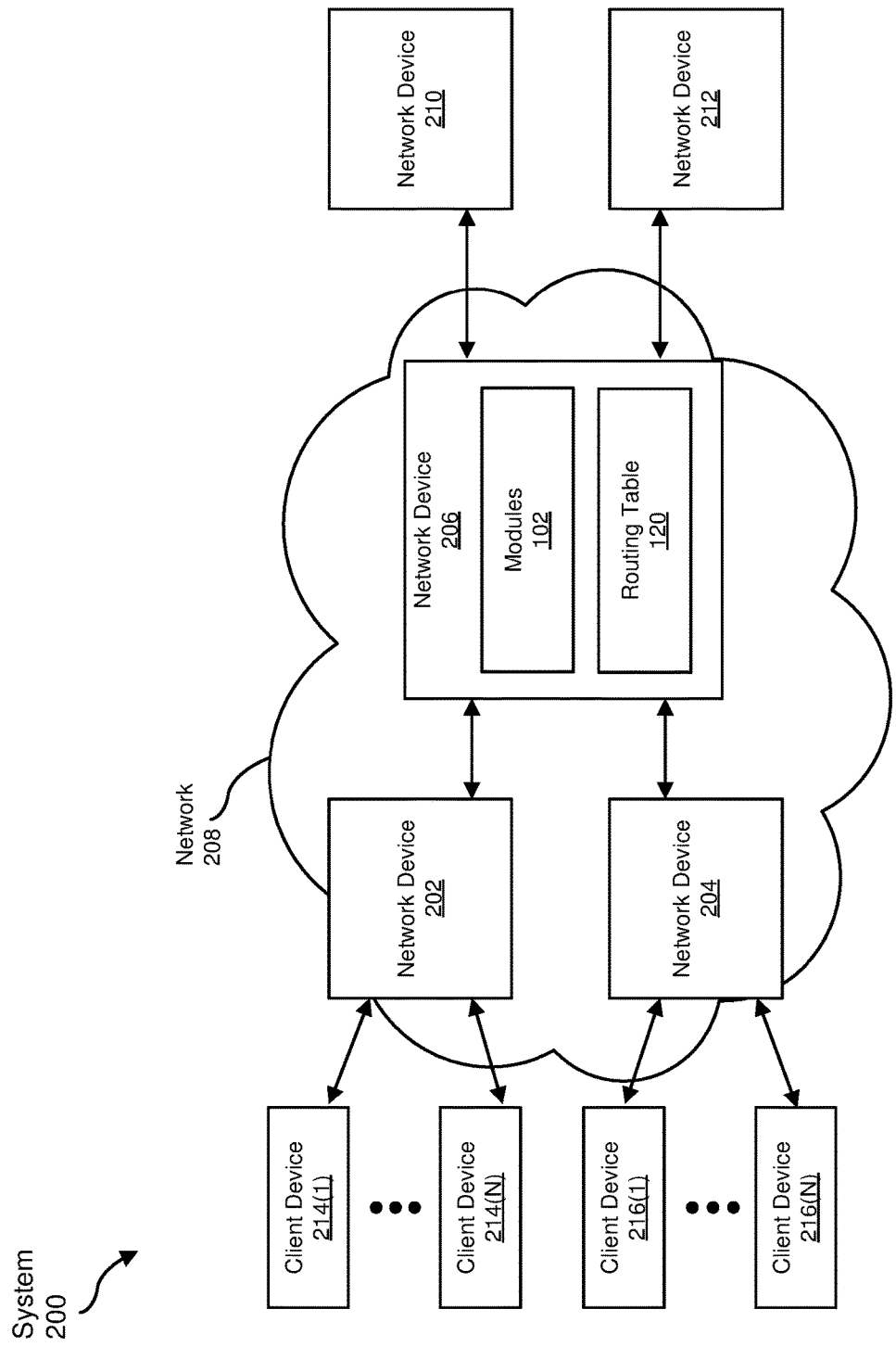
FIG. 2 is a block diagram of an exemplary system for classifying uplink and downlink traffic in networks.
Figure 3:
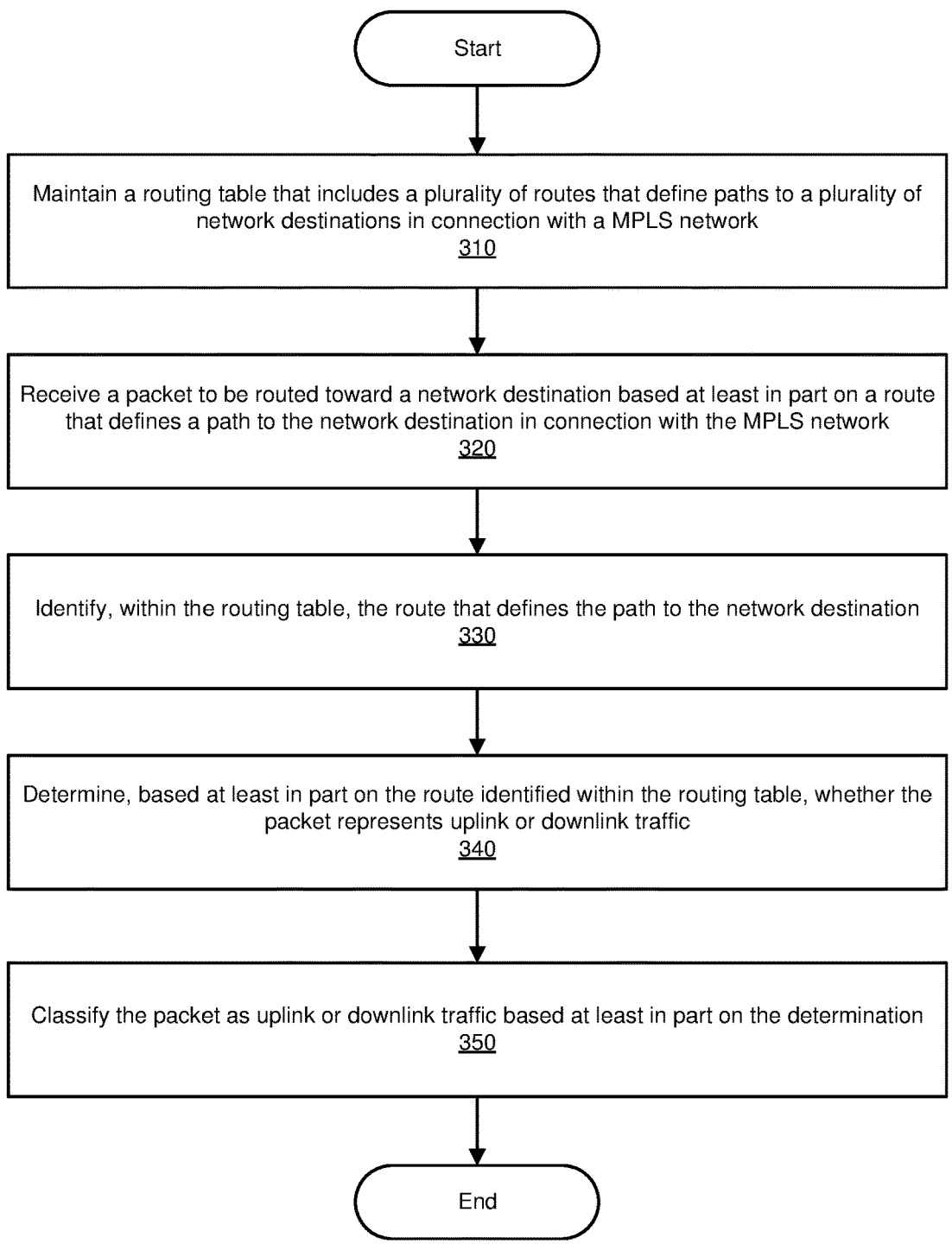
FIG. 3 is a flow diagram of an exemplary method for classifying uplink and downlink traffic in networks.
Figure 4:
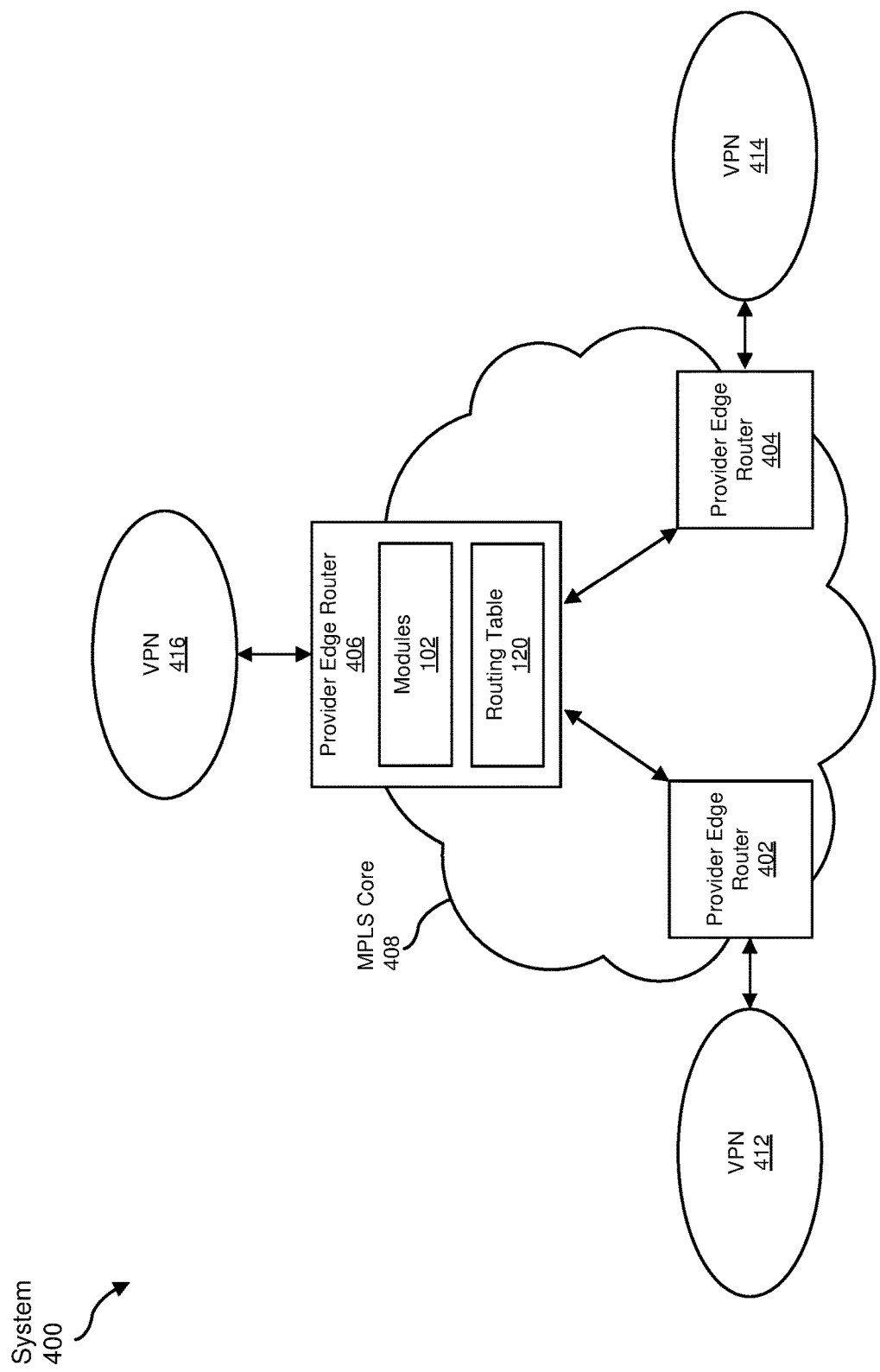
FIG. 4 is a block diagram of an exemplary system for classifying uplink and downlink traffic in networks.

The following will provide, with reference to FIGS. 1, 2, and 4, detailed descriptions of exemplary systems for classifying uplink and downlink traffic in networks. Detailed descriptions of corresponding computer-implemented methods will be provided in connection with FIG. 3. Detailed descriptions of an exemplary routing table will be provided in connection with FIG. 5. In addition, detailed descriptions of an exemplary computing system capable of implementing one or more of the embodiments described herein will be provided in connection with FIG. 6.

FIG. 1 is a block diagram of an exemplary system 100 for classifying uplink and downlink traffic in networks. As illustrated in this figure, exemplary system 100 may include one or more modules 102 for performing one or more tasks. For example, and as will be explained in greater detail below, exemplary system 100 may include a maintenance module 104 that maintains a routing table that includes a plurality of routes that define paths to a plurality of network destinations in connection with a network. Exemplary system 100 may also include a receiving module 106 that receives a packet to be routed toward a network destination based at least in part on a route that defines a path to the network destination in connection with the network.

In addition, and as will be described in greater detail below, exemplary system 100 may include an identification module 108 that identifies, within the routing table, the route that defines the path to the network destination. Moreover, exemplary system 100 may include a determination module 110 that determines, based at least in part on the route identified within the routing table, whether the packet represents uplink or downlink traffic. Exemplary system 100 may further include a classification module 112 that classifies the packet as uplink or downlink traffic based at least in part on the determination. Finally, exemplary system 100 may include an enforcement module 114 that applies a policy to the packet due at least in part to the packet heading in a specific direction. Although illustrated as separate elements, one or more of modules 102 in FIG. 1 may represent portions of a single module or application, such as a Service Delivery Gateway (SDG).

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent software modules stored and configured to run on one or more computing devices, such as any of the devices illustrated in FIG. 2 (e.g., network devices 202, 204, 206, 210, and/or 212), any of the devices illustrated in FIG. 4 (e.g., provider edge routers 402, 404, and/or 406), and/or computing system 600 in FIG. 6. One or more of modules 102 in FIG. 1 may also represent all or portions of one or more special-purpose computers configured to perform one or more tasks.

As illustrated in FIG. 1, system 100 may also include one or more routing tables, such as routing table 120. In one example, routing table 120 may include and/or represent a plurality of routes that define paths to a plurality of network destinations in connection with an MPLS network. The term "path," as used herein, generally refers to any type or form of link and/or series of devices that facilitates communication and/or the flow of traffic between a source and a destination within a network and/or across networks. The term "route," as used herein, generally refers to any type or form of information, data, and/or representation that indicates and/or identifies a path within a network or across networks.

Routing table 120 generally represents any type or form of table and/or database that includes, stores, and/or identifies one or more routes. In one example, routing table 120 may include a plurality of routes. In this example, the routes may be arranged and/or organized within routing table 120 in a variety of ways. Each route may indicate and/or identify various information and/or data representative of a path. Examples of such information and/or data include, without limitation, the IP address of the destination device, the IP address of a gateway device, a routing prefix of the destination or gateway device, a subscriber identifier that identifies a subscriber of a service provider, the direction of traffic, the IP address of the next hop, a network mask, combinations or variations of one or more of the same, and/or any other suitable information or data.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network 208 that includes network devices 202, 204, and 206. Network 208 may support and/or facilitate communication and/or data transfer among client devices 214(1)-(N) and 216(1)-(N) and network devices 210 and 212. Although FIG. 2 illustrates only network devices 202, 204, and 206 within network 208, various other network devices and/or computing devices may represent part of network 208 and/or be included in network 208.

In one example, network device 206 may be programmed with one or more of modules 102. In this example, network device 206 may include, store, and/or maintain routing table 120. Although not necessarily illustrated in this way in FIG. 2, network devices 202, 204, 210, and/or 212 may also be programmed with one or more of modules 102. Similarly, although not necessarily illustrated in this way in FIG. 2, network devices 202, 204, 210, and/or 212 may also include, store, and/or maintain a routing table.

In one example, one or more of modules 102 from FIG. 1 may, when executed by at least one processor of network device 206 in FIG. 2, enable network device 206 to classify uplink and downlink traffic in a network. For example, and as will be described in greater detail below, one or more of modules 102 may cause network device 206 to (1) maintain routing table 120 in connection with network 208, (2) receive a packet to be routed toward a network destination based at least in part on a route that defines a path to the network destination in connection with the network, (3) identify, within routing table 120, the route that defines the path to the network destination, (4) determine, based at least in part on the route identified within routing table 120, whether the packet represents uplink or downlink traffic, and then (5) classify the packet as uplink or downlink traffic based at least in part on the determination.

Network devices 202, 204, 206, 210, and/or 212 each generally represent any type or form of device, system, and/or mechanism that facilitates communication and/or network traffic among computing devices and/or within a network or across networks. In one example, network devices 202, 204, and 206 may include and/or represent provider edge routers within an MPLS network of a service provider. In this example, network devices 210 and 212 may include and/or represent gateways to other networks that interface with the service provider's MPLS network. Examples of network devices 202, 204, 206, 210, and/or 212 include, without limitation, routers (such as provider edge routers, hub routers, spoke routers, autonomous system boundary routers, and/or area border routers), switches, hubs, modems, bridges, repeaters, gateways, multiplexers, network adapters, network interfaces, network racks, chasses, servers, portions of one or more of the same, combinations or variations of one or more of the same, and/or any other suitable network device.

Client devices 214(1)-(N) and/or 216(1)-(N) each generally represent any type or form of computing device capable of reading computer-executable instructions. In one example, client devices 214(1)-(N) may include and/or represent devices operated by subscribers and/or customers of a network service that provided by a service provider via network 208. Accordingly, each of client devices 214(1)-(N) may correspond to a specific subscriber or customer of the network service. Examples of client devices 214(1)-(N) and/or 216(1)-(N) include, without limitation, laptops, tablets, desktops, servers, cellular phones, Personal Digital Assistants (PDAs), multimedia players, embedded systems, wearable devices (e.g., smart watches, smart glasses, etc.), gaming consoles, end-user devices, exemplary computing system 600 in FIG. 6, portions of one or more of the same, combinations or variations of one or more of the same, and/or any other suitable computing device.

Network 208 generally represents to any type or form of medium and/or architecture that facilitates communication or data transfer. In one example, network 204 may represent an MPLS network that includes a plurality of network devices that support and/or facilitate L3VPN traffic for VRF subscribers of a service provider (such as AT&T, VERIZON WIRELESS, SPRINT, T-MOBILE, FACEBOOK, GOOGLE, INSTAGRAM, NETFLIX, AMAZON, YOUTUBE, CENTURY LINK, COMCAST, DIRECTV, and/or APPLE). In another example, network 204 may represent a non-MPLS network that includes a plurality of network devices. Examples of network 208 include, without limitation, an MPLS network, a non-MPLS network, an Internet Protocol (IP) network, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, combinations or variations of one or more of the same, and/or any other suitable network. Network 204 may facilitate communication or data transfer using wireless and/or wired connections. Although network devices 210 and 212 and client devices 214(1)-(N) and 216(1)-(N) are illustrated as being external to network 208 in FIG. 2, one or more of network devices 210 and 212 and client devices 214(1)-(N) and 216(1)-(N) may alternatively represent portions of network 208 and/or be included in network 208.

FIG. 3 is a flow diagram of an exemplary computer-implemented method 300 for classifying uplink and downlink traffic in networks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, system 400 in FIG. 4, and/or computing system 600 in FIG. 6.

As illustrated in FIG. 3, at step 310 one or more of the systems described herein may maintain a routing table that includes a plurality of routes that define paths to a plurality of network destinations in connection with a network. For example, maintenance module 104 may, as part of network device 206 in FIG. 2, maintain routing table 120 that includes a plurality of routes. In one example, these routes may define paths from network device 206 to other devices inside network 208 (such as network devices 202 and 204) and/or to other devices outside network 208 (such as network devices 210 and 212 and client devices 214(1)-(N) and 216(1)-(N)). Accordingly, network destinations may include and/or represent devices inside network 208 as well as devices outside network 208. Examples of such network destinations include, without limitation, gateways to other networks, client devices, routers, switches, next hops, combinations or variations of one or more of the same, and/or any other suitable network destinations.

The systems described herein may perform step 310 in a variety of ways and/or contexts. In one example, maintenance module 104 may create routing table 120 by dynamically learning the routes via routing protocols. For example, maintenance module 104 may implement a Border Gateway Protocol (BGP) to identify and/or learn various routes inside network 208 and/or routes that lead outside network 208. In this example, maintenance module 104 may identify and/or learn these routes from neighboring network devices (such as network devices 202, 204, 210, and/or 212).

In one example, these network devices may advertise certain routes to one another. For example, network devices 202, 204, 210, and/or 212 may advertise various routes to network device 206. As these advertisements reach network device 206, maintenance module 104 may detect and/or identify these advertisements. Maintenance module 104 may then create routing table 120 based at least in part on the routes advertised by network devices 202, 204, 210, and/or 212.

In one example, maintenance module 104 may modify and/or update routing table 120 by adding new and/or unknown routes to routing table 120. For example, an administrator of network 208 may define and/or install a path within network 208. In this example, the administrator may create and/or upload a route that represents this path via network device 202. In turn, network device 202 may advertise this route to network devices 204 and/or 206 by way of BGP. As the advertisement reaches network device 206, maintenance module may identify the route within the advertisement and then add the route to routing table 120.

In one example, maintenance module 104 may modify and/or update routing table 120 by classifying, designating, and/or marking the routes as being either uplink or downlink routes. For example, an administrator of network 208 may define paths that lead toward client devices 214(1)-(N) and/or 216(1)-(N) as downlink routes. Similarly, the administrator of network 208 may define paths that lead toward network devices 210 and/or 212 as uplink routes.

In a specific example, client devices 214(1)-(N) and 216(1)-(N) may represent end-user devices operated by subscribers of a service provider. In this example, network devices 202 and 204 may include and/or represent routers that interface with those end-user devices. Network device 210 may include and/or represent a gateway to an intranet datacenter, and network device 212 may include and/or represent a gateway to the Internet. Finally, network device 206 may represent a router that interfaces with those gateways to the intranet datacenter and the Internet.

Continuing with this example, the routers may include and/or contain various physical and/or logical interfaces. Examples of these physical interfaces include, without limitation, line cards, Physical Interface Cards (PICS), physical communication ports, Flexible PIC Concentrators (FPCs), module port concentrators, Switch Interface Boards (SIBS), routing engines, portions of one or more of the same, combinations or variations of one or more of the same, and/or any other suitable physical interfaces. Examples of these logical interfaces include, without limitation, VPNs, Virtual Local Area Networks (VLANs), virtual and/or logical ports, portions of one or more of the same, combinations of one or more of the same, and/or any other suitable logical interfaces.

In some examples, a service provider's router may associate one or more physical or logical interfaces with a specific subscriber. In such examples, this subscriber may have exclusive use of these physical or logical interfaces such that only this subscriber's traffic is routed through these physical or logical interfaces. Additionally or alternatively, the service provider's router may determine which subscriber is responsible for certain network traffic based at least in part on the source or destination IP address identified in the packets. Accordingly, the service provider's router may be able to attribute such network traffic to the correct subscriber since the source or destination IP address identified in the packets uniquely corresponds to that subscriber.

Returning to FIG. 3, at step 320 one or more of the systems described herein may receive a packet to be routed toward a network destination based at least in part on a route that defines a path to the network destination in connection with the network. For example, receiving module 106 may, as part of network device 206 in FIG. 2, receive a packet to be routed toward a network destination based at least in part on a route that defines a path to the network destination in connection with the network. The term "packet," as used herein, generally refers to any type or form of package, encapsulation, abstraction, and/or object that includes one or more formatted units of data. Examples of such a packet include, without limitation, Internet Protocol version 4 (IPv4) packets, Internet Protocol version 6 (IPv6) packets, MPLS packets, L3VPN packets, User Data Protocol (UDP) packets, Internet Control Message Protocol (ICMP) packets, Gateway-to-Gateway Protocol (GGP) packets, Transmission Control Protocol (TCP) packets, combinations or variations of one or more of the same, or any other suitable packet.

The systems described herein may perform step 320 in a variety of ways and/or contexts. In one example, receiving module 106 may detect and/or receive the packet from network device 202. In this example, the packet may be destined for the Internet, which may be reached via network device 212.

In another example, receiving module 106 may detect and/or receive the packet from network device 204. In this example, the packet may be destined for an intranet datacenter, which may be reached via network device 210.

In a further example, receiving module 106 may detect and/or receive the packet from network device 210. In this example, the packet may be destined for client device 214(1), which may be reached via network device 202.

In an additional example, receiving module 106 may detect and/or receive the packet from network device 212. In this example, the packet may be destined for client device 216(N), which may be reached via network device 204.

Once the packet has reached network device 206, identification module 108 may identify one or more routing identifiers that facilitate searching routing table 120 for the correct route to the network destination. For example, identification module 108 may locate a routing identifier in the header of the packet. Examples of such routing identifiers include, without limitation, the IP address of the destination or gateway device, a routing prefix of the destination or gateway device, a subscriber identifier that identifies a subscriber of a service provider, the IP address of the next hop, a network mask, combinations or variations of one or more of the same, and/or any other suitable routing identifiers.

Returning to FIG. 3, at step 330 one or more of the systems described herein may identify, within the routing table, the route that defines the path to the network destination. For example, identification module 108 may, as part of network device 206 in FIG. 2, identify the route within routing table 120. In this example, the route may indicate and/or identify at least a portion of the path to the network destination of the packet by way of network 208.

The systems described herein may perform step 330 in a variety of ways and/or contexts. In one example, identification module 108 may identify the route based at least in part on any routing identifiers found within the packet. For example, identification module 108 may search routing table 120 for the route using the network destination's IP address. During this search, identification module 108 may find the route associated with the routing identifier(s).

As a specific example, identification module 108 may search routing table 120 in FIG. 5 for the correct route to the network destination. As illustrated in FIG. 5, exemplary routing table 120 may be formatted with multiple categories (in this example, "Destination," "Gateway," "Subscriber Identifier," and "Traffic Direction"). Accordingly, the routes may consist of table entries for each of these categories. Although exemplary routing table 120 is formatted in this way in FIG. 5, other routing tables may include additional categories and/or exclude certain categories.

As illustrated in FIG. 5, exemplary routing table 120 may include a first route (in this example, "10.52.50.1," "10.52.50.0," "9928372761," and "Uplink"), a second route (in this example "10.52.78.2," "10.52.51.1," "1298380372," and "Downlink"), a third route (in this example, "10.52.52.4," "10.52.52.3," "2482770462," and "Uplink"), a fourth route (in this example, "10.52.60.4," "10.52.60.0," "4876093480," and "Downlink"), a fifth route (in this example, "10.52.60.5," "10.52.60.0," "1838904009," and "Downlink"), a sixth route (in this example, "10.52.60.6," "10.52.60.0," "7973478021," and "Downlink"), and a seventh route (in this example, "10.52.62.4," "10.52.60.0," "4894020923," and "Downlink").

In one example, identification module 108 may identify "10.52.50.1" as the IP address of the destination device in the header of the packet. In this example, identification module 108 may search routing table 120 in FIG. 5 for the route associated with the "10.52.50.1" IP address. During this search, identification module 108 may find the correct route based at least in part on the "10.52.50.1" IP address. Identification module 108 may then identify "10.52.50.0" as the routing prefix corresponding to the gateway that leads to the destination device.

Returning to FIG. 3, at step 340 one or more of the systems described herein may determine, based at least in part on the route identified within the routing table, whether the packet represents uplink or downlink traffic. For example, determination module 110 may, as part of network device 206 in FIG. 2, determine whether the packet represents uplink or downlink traffic. In this example, determination module 110 may arrive at this determination based at least in part on the route within routing table 120.

The systems described herein may perform step 340 in a variety of ways and/or contexts. In one example, determination module 110 may determine whether the packet represents uplink or downlink traffic by identifying the corresponding table entry for traffic direction within routing table 120. For example, determination module 110 may identify a category that indicates traffic direction within routing table 120. In this example, determination module 110 may locate the table entry corresponding to this category within the route of the packet. Determination module 110 may determine that the traffic direction of the packet is uplink or downlink based at least in part on this table entry within the route of the packet.

As a specific example, determination module 110 may identify the "Traffic Direction" category within routing table 120 in FIG. 5. In this example, determination module 110 may determine that the traffic direction for the route to the "10.52.50.1" IP address is uplink. Similarly, determination module 110 may determine that the traffic direction for the route to the "10.52.60.5" IP address is downlink.

Returning to FIG. 3, at step 350 one or more of the systems described herein may classify the packet as uplink or downlink traffic based at least in part on the determination. For example, classification module 112 may, as part of network device 206 in FIG. 2, classify the packet as uplink or downlink traffic based at least in part on the determination. In this example, uplink traffic may include and/or represent packets that originate from a computing device of a service provider's subscriber and traverse toward an external network (such as the Internet). In contrast, downlink traffic may include and/or represent packets that originate from an external network and traverse toward a computing device of a service provider's subscriber. In other words, from the perspective of a subscriber's computing device, uplink traffic may represent uploaded data, and downlink traffic may represent downloaded data.

The systems described herein may perform step 350 in a variety of ways and/or contexts. In some examples, classification module 112 may classify the packet as uplink or downlink traffic based at least in part on the route of the packet. For example, classification module 112 may mark the packet as uplink traffic in the event that the route identified for the packet is an uplink route. In this example, the mark applied to the packet may indicate that the packet belongs to an uplink destination class.

In another example, classification module 112 may mark the packet as downlink traffic in the event that the route identified for the packet is a downlink route. In this example, the mark applied to the packet may indicate that the packet belongs to a downlink destination class.

In some examples, classification module 112 may track and/or report the amount of uplink and/or downlink traffic of the service provider's subscribers. For example, classification module 112 may track the number of uplink packets originating from a subscriber's device and/or report this number to a server of the service provider. The service provider may then apply certain policies to the subscriber's traffic and/or certain charges to the subscriber's account.

In one example, classification module 112 may track the number of downlink packets originating from a subscriber's device and/or report this number to a server of the service provider. The service provider may then apply certain policies to the subscriber's traffic and/or certain charges to the subscriber's account.

In some examples, identification module 108 may identify a policy that corresponds to a specific direction of network traffic in connection with the subscriber. In other words, identification module 108 may identify a policy that corresponds to uplink traffic and/or downlink traffic of the subscriber. For example, identification module 108 may identify a traffic service policy of the subscriber whose computing device sourced the packet in connection with a network service. Additionally or alternatively, identification module 108 may identify a traffic service policy of the subscriber whose computing device is to receive the packet in connection with a network service. Enforcement module 114 may then apply the traffic service policy to the packet because the packet is heading in the direction to which the traffic service policy corresponds.

In one example, the policy may include, identify, and/or indicate one or more limits to the network service of the subscriber. For example, the policy may indicate that the subscriber is permitted to upload, download, and/or stream only up to 12 gigabytes of data per month. Additionally or alternatively, the policy may indicate that the subscriber is permitted to upload data at a rate or speed of only up to 16 megabits per second and/or download data at a rate or speed of only up to 24 megabits per second.

In one example, identification module 108 may identify these limits on the subscriber's network service within the policy. In this example, enforcement module 114 may enforce these limits on network traffic that includes the packet due at least in part on the network traffic originating from and/or being destined for the subscriber's computing device.

As part of enforcing the policy, enforcement module 114 may perform bandwidth throttling on the network traffic that includes the packet. In another example, enforcement module 114 may block network traffic that includes the packet based at least in part on the policy. Additionally or alternatively, enforcement module 114 may redirect network traffic that includes the packet from one device to another based at least in part on the policy.

FIG. 4 is a block diagram of an exemplary system 400 for classifying uplink and downlink traffic in networks. As illustrated in FIG. 4, system 400 may include an MPLS core 408 that facilitates communication among VPNs 412, 414, and 416. MPLS core 408 may include provider edge routers 402, 404, and 406 that interface with VPNs 412, 414, and 416, respectively. In this example, provider edge router 406 may include and/or represent a hub router, and provider edge routers 402 and 404 may each include and/or represent a spoke router.

In one example, provider edge router 406 may maintain routing table 120 that includes routes that define paths to provider edge routers 402 and 404 as well as VPNs 412, 414, and 416 in connection with MPLS core 408. These routes may indicate that packets that originate at VPN 412 and traverse toward VPN 414 constitute and/or represent L3VPN uplink traffic. Additionally or alternatively, these routes may indicate that packets that originate at VPN 414 and traverse toward VPN 412 constitute and/or represent L3VPN downlink traffic.

In this example, provider edge router 406 may perform Traffic Direction Function (TDF) on packets traversing across MPLS core 408. For example, provider edge router 406 may receive a packet from provider edge router 402. This packet may have originated at VPN 412 and be destined for VPN 414.

Upon receiving this packet, provider edge router 406 may identify the route that defines the path to VPN 414 within routing table 120. Provider edge router 406 may then determine that that the packet constitutes and/or represents L3VPN uplink traffic by checking the destination class of the route identified within routing table 120. In this example, the destination class may indicate that the direction of the route is uplink. Provider edge router 406 may classify the packet as L3VPN uplink traffic since the packet is traversing from VPN 412 to VPN 414 and then forward the packet to provider edge router 404 on the way to VPN 414.

As another example, provider edge router 406 may receive a packet from provider edge router 404. This packet may have originated at VPN 414 and be destined for VPN 412. Upon receiving this packet, provider edge router 406 may identify the route that defines the path to VPN 414 within routing table 120. Provider edge router 406 may then determine that that the packet constitutes and/or represents L3VPN downlink traffic by checking the destination class of the route identified within routing table 120. In this example, the destination class may indicate that the direction of the route is downlink. Provider edge router 406 may classify the packet as L3VPN downlink traffic since the packet is traversing from VPN 414 to VPN 412 and then forward the packet to provider edge router 402 on the way to VPN 412.

Figure 6:
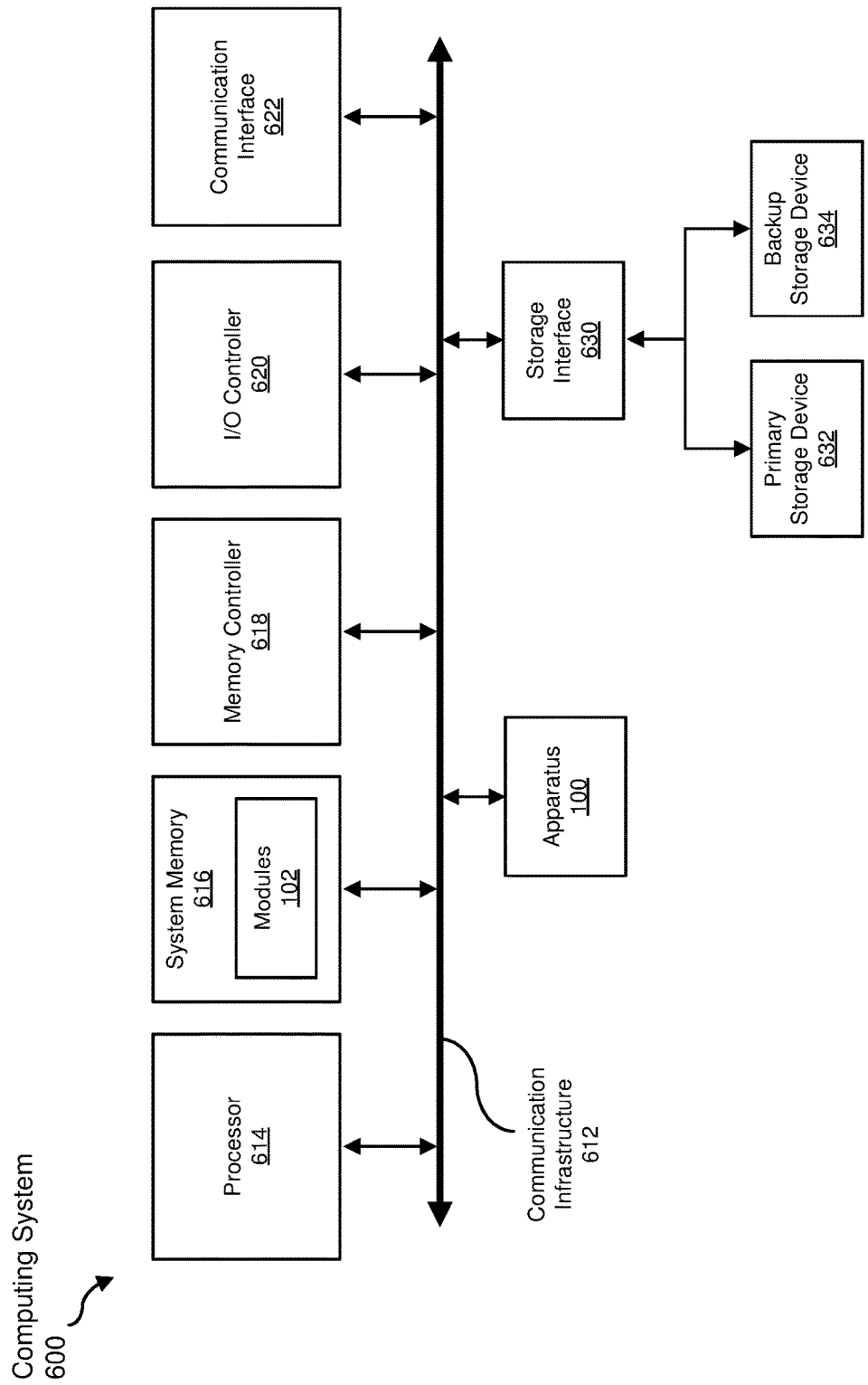
FIG. 6 is a block diagram of an exemplary computing system capable of implementing and/or being used in connection with one or more of the embodiments described and/or illustrated herein.

FIG. 6 is a block diagram of an exemplary computing system 600 capable of implementing and/or being used in connection with one or more of the embodiments described and/or illustrated herein. In some embodiments, all or a portion of computing system 600 may perform and/or be a means for performing, either alone or in combination with other elements, one or more of the steps described in connection with FIG. 3. All ora portion of computing system 600 may also perform and/or be a means for performing and/or implementing any other steps, methods, or processes described and/or illustrated herein. In one example, computing system 600 may include an apparatus that performs and/or constitutes a means for performing and/or implementing any other steps, methods, or processes described and/or illustrated herein.

Computing system 600 broadly represents any type or form of electrical load, including a single or multi-processor computing device or system capable of executing computer-readable instructions. Examples of computing system 600 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 600 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 600 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 600 may include various network and/or computing components. For example, computing system 600 may include at least one processor 614 and a system memory 616. Processor 614 generally represents any type or form of processing unit capable of processing data or interpreting and executing instructions. For example, processor 614 may represent an application-specific integrated circuit (ASIC), a system on a chip (e.g., a network processor), a hardware accelerator, a general purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 600 may include both a volatile memory unit (such as, for example, system memory 616) and a non-volatile storage device (such as, for example, primary storage device 632, as described in detail below). System memory 616 may be implemented as shared memory and/or distributed memory in a network device. Furthermore, system memory 616 may store packets and/or other information used in networking operations. In one example, system memory 616 may include and/or store one or more of modules 102 from FIG. 1.

In certain embodiments, exemplary computing system 600 may also include one or more components or elements in addition to processor 614 and system memory 616. For example, as illustrated in FIG. 6, computing system 600 may include a memory controller 618, an Input/Output (I/O) controller 620, and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of computing system 600. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) to or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of computing system 600, such as processor 614, system memory 616, communication interface 622, and storage interface 630.

Communication interface 622 broadly represents any type or form of communication device or adapter capable of facilitating communication between exemplary computing system 600 and one or more additional devices. For example, in certain embodiments communication interface 622 may facilitate communication between computing system 600 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also enable computing system 600 to engage in distributed or remote computing. For example, communication interface 622 may receive instructions from a remote device or send instructions to a remote device for execution.

As illustrated in FIG. 6, exemplary computing system 600 may also include a primary storage device 632 and/or a backup storage device 634 coupled to communication infrastructure 612 via a storage interface 630. Storage devices 632 and 634 generally represent any type or form of storage device or medium capable of storing data and/or other computer-readable instructions. For example, storage devices 632 and 634 may represent a magnetic disk drive (e.g., a so-called hard drive), a solid state drive, a floppy disk drive, a magnetic tape drive, an optical disk drive, a flash drive, or the like. Storage interface 630 generally represents any type or form of interface or device for transferring data between storage devices 632 and 634 and other components of computing system 600.

In certain embodiments, storage devices 632 and 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 634 may also include other similar structures or devices for allowing computer software, data, or other computer-readable instructions to be loaded into computing system 600. For example, storage devices 632 and 634 may be configured to read and write software, data, or other computer-readable information. Storage devices 632 and 634 may be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from those shown in FIG. 6. Computing system 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
    maintaining, at a router within a Multiprotocol Label Switching (MPLS) network, a routing table that includes:
        a plurality of routes that define paths to a plurality of network destinations in connection with the MPLS network, wherein the plurality of routes include a route that defines a path for traffic that originates from a first Virtual Private Network (VPN) and is destined for a second VPN;
        a plurality of subscriber identifiers that identify subscribers of a service provider that are associated with the plurality of routes; and
        a plurality of route designations indicating whether the plurality of routes correspond to uplink or downlink Layer 3 Virtual Private Network (L3VPN) traffic, wherein:
            uplink L3VPN traffic comprises L3VPN traffic that originates from a computing device of the subscriber of the service provider; and
            downlink L3VPN traffic comprises L3VPN traffic that is destined for a computing device of the subscriber of the service provider;
    receiving, at a network interface that handles both uplink and downlink traffic, a packet to be routed toward the second VPN based at least in part on the route that defines the path, wherein the packet originated from the first VPN and is destined for the second VPN;
    identifying, within the routing table, the route that defines the path and a route designation indicating whether the route corresponds to uplink or downlink L3VPN traffic;
    determining, based at least in part on the route designation identified within the routing table, whether the packet represents uplink or downlink L3VPN traffic;
    classifying the packet as uplink or downlink L3VPN traffic based at least in part on the determination;
    identifying, within the routing table, a subscriber identifier that identifies the subscriber of the service provider as being associated with the route;
    identifying a policy that corresponds to a specific direction of L3VPN traffic for the subscriber of the service provider; and
    applying the policy to the packet due at least in part to:
        the packet heading in the specific direction to which the policy corresponds; and
        the subscriber of the service provider being associated with the route with which the packet is routed toward the second VPN.

2. The method of claim 1, wherein:
    identifying the policy comprises:
        identifying a policy of the subscriber whose computing system sourced the packet in connection with a network service; and
        identifying, based at least in part on the policy, at least one limit to the network service of the subscriber; and
    applying the policy to the packet comprises enforcing the limit on L3VPN traffic that includes the packet due at least in part to the L3VPN traffic originating from the computing system of the subscriber.

3. The method of claim 1, wherein applying the policy comprises at least one of:
    performing bandwidth throttling on L3VPN traffic that includes the packet based at least in part on the policy;
    blocking L3VPN traffic that includes the packet based at least in part on the policy; and
    redirecting L3VPN traffic that includes the packet based at least in part on the policy.

4. The method of claim 1, wherein the specific direction of L3VPN traffic comprises at least one of:
    uplink traffic; and
    downlink traffic.

5. The method of claim 1, wherein:
    receiving the packet to be routed toward the network destination comprises identifying, within the packet, at least one routing identifier that identifies at least a portion of the path to the network destination; and
    identifying the route that defines the path to the network destination comprises:
        searching the routing table for a route associated with the routing identifier; and
        finding, during the search, the route associated with the routing identifier.

6. The method of claim 5, wherein the routing identifier comprises at least one of:
    a routing prefix associated with the network destination;
    an Internet Protocol (IP) address of a next hop of the packet; and
    a subscriber identifier that identifies at least one network interface associated with at least one subscriber of a network service.

7. The method of claim 1, wherein maintaining the routing table comprises:
    receiving, from an administrator of a network service, a route designation indicating whether a route corresponds to uplink or downlink traffic; and modifying the routing table to account for the route designation such that the routing table indicates whether the route corresponds to uplink or downlink traffic.

8. The method of claim 7, wherein modifying the routing table comprises:
adding the route to the routing table; and
marking the route as corresponding to uplink or downlink traffic.

9. The method of claim 1, wherein the plurality of network destinations comprises:
a gateway to another network;
a client device;
a router; and
a next hop.

10. The method of claim 1, wherein the packet comprises a portion of L3VPN traffic supported by a Virtual Routing and Forwarding (VRF) service.

11. A system comprising:
a maintenance module, stored in memory at a router within a Multiprotocol Label Switching (MPLS) network, that maintains a routing table that includes:
  a plurality of routes that define paths to a plurality of network destinations in connection with the MPLS network, wherein the plurality of routes include a route that defines a path for traffic that originates from a first Virtual Private Network (VPN) and is destined for a second VPN; and
  a plurality of subscriber identifiers that identify subscribers of a service provider that are associated with the plurality of routes;
  a plurality of route designations indicating whether the plurality of routes correspond to uplink or downlink Layer 3 Virtual Private Network (L3VPN) traffic, wherein:
    uplink L3VPN traffic comprises L3VPN traffic that originates from a computing device of a subscriber of the service provider; and
    downlink L3VPN traffic comprises L3VPN traffic that is destined for a computing device of the of a subscriber of the service provider;
a receiving module, stored in memory, that receives, via a network interface that handles both uplink and downlink traffic, a packet to be routed toward the second VPN based at least in part on the route that defines the path, wherein the packet originated from the first VPN and is destined for the second VPN;
an identification module, stored in memory, that identifies, within the routing table, the route that defines the path and a route designation indicating whether the route corresponds to uplink or downlink L3VPN traffic;
a determination module, stored in memory, that determines, based at least in part on the route designation identified within the routing table, whether the packet represents uplink or downlink L3VPN traffic;
a classification module, stored in memory, that classifies the packet as uplink or downlink L3VPN traffic based at least in part on the determination;
wherein the identification module:
  identifies, within the routing table, a subscriber identifier that identifies the subscriber of the service provider as being associated with the route; and
  identifies a policy that corresponds to a specific direction of L3VPN traffic for the subscriber of the service provider;
an enforcement module, stored in memory, that applies the policy to the packet due at least in part to:
  the packet heading in the specific direction to which the policy corresponds; and
  the subscriber of the service provider being associated with the route with which the packet is routed toward the second VPN; and
at least one physical processor that executes the maintenance module, the receiving module, the identification module, the determination module, the classification module, and the enforcement module.

12. The system of claim 11, wherein:
the identification module:
  identifies a policy of the subscriber whose computing system sourced the packet in connection with a network service; and
  identifying, based at least in part on the policy, at least one limit to the network service of the subscriber; and
the enforcement module enforces the limit on L3VPN traffic that includes the packet due at least in part to the L3VPN traffic originating from the computing system of the subscriber.

13. The system of claim 11, wherein the enforcement module applies the policy by at least one of:
performing bandwidth throttling on L3VPN traffic that includes the packet based at least in part on the policy;
blocking L3VPN traffic that includes the packet based at least in part on the policy; and
redirecting L3VPN traffic that includes the packet based at least in part on the policy.

14. The system of claim 11, wherein the specific direction of L3VPN traffic comprises at least one of:
uplink traffic; and
downlink traffic.

15. The system of claim 11, wherein the identification module:
identifies, within the packet, at least one routing identifier that identifies at least a portion of the path to the network destination; and
searches the routing table for a route associated with the routing identifier; and
finds, during the search, the route associated with the routing identifier.

16. The system of claim 15, wherein the routing identifier comprises at least one of:
a routing prefix associated with the network destination;
an IP address of a next hop of the packet; and
a subscriber identifier that identifies at least one network interface associated with at least one subscriber of a network service.

17. The system of claim 11, wherein:
the receiving module receives, from an administrator of a network service, a route designation indicating whether a route corresponds to uplink or downlink traffic; and
the maintenance module modifies the routing table to account for the route designation such that the routing table indicates whether the route corresponds to uplink or downlink traffic.

18. An apparatus comprising:
a memory device that stores, at a router within a Multiprotocol Label Switching (MPLS) network, a routing table that includes:
  a plurality of routes that define paths to a plurality of network destinations in connection with the MPLS network, wherein the plurality of routes include a route that defines a path for traffic that originates from a first Virtual Private Network (VPN) and is destined for a second VPN; and a plurality of subscriber identifiers that identify subscribers of a service provider that are associated with the plurality of routes;
a plurality of route designations indicating whether the plurality of routes correspond to uplink or downlink Layer 3 Virtual Private Network (L3VPN) traffic, wherein:
   uplink L3VPN traffic comprises L3VPN traffic that originates from a computing device of a subscriber of the service provider; and
   downlink L3VPN traffic comprises L3VPN traffic that is destined for a computing device of the of a subscriber of the service provider;
a processing unit communicatively coupled to the memory device, wherein the processing unit:
   receives, via a network interface that handles both uplink and downlink traffic, a packet to be routed toward the second VPN based at least in part on the route that defines the path, wherein the packet originated from the first VPN and is destined for the second VPN;
   identifies, within the routing table, the route that defines the path and a route designation indicating whether the route corresponds to uplink or downlink L3VPN traffic;
   determines, based at least in part on the route designation identified within the routing table, whether the packet represents uplink or downlink L3VPN traffic;
   classifies the packet as uplink or downlink L3VPN traffic based at least in part on the determination;
   identifies, within the routing table, a subscriber identifier that identifies the subscriber of the service provider as being associated with the route;
   identifies a policy that corresponds to a specific direction of L3VPN traffic for the subscriber of the service provider; and
   applies the policy to the packet due at least in part to:
     the packet heading in the specific direction to which the policy corresponds; and
     the subscriber of the service provider being associated with the route with which the packet is routed toward the second VPN.

\* \* \* \* \*